United States Patent Office 3,114,771
Patented Dec. 17, 1963

3,114,771
BIMETALLIC SALTS OF 2-AMINODIHYDROXY-METHYL-1-PROPENE
David O. De Pree and Earl G. De Witt, Baton Rouge, La., assignors to Ethyl Corporation, New York, N.Y., a corporation of Virginia
No Drawing. Filed Mar. 9, 1959, Ser. No. 797,844
6 Claims. (Cl. 260—584)

This invention relates to novel metallic salts and the production thereof. In particular, the subject invention is concerned with providing metal salts of a 2-(aminodihydroxymethyl)-1-propene.

These compounds are interesting bimetallic salts which convert to organometallic compounds with evolution of gas upon heating to a determinate conversion temperature. The discovery of these materials and the convertibility thereof has resulted in a heretofore unavailable synthesis of the metal salts of a 2-carboxy-3-metallo propene. In addition the compounds of this invention provide a more simple and economical route for the preparation of methacrylamides, the latter being desirable for the production of polymers.

One of the objects of this invention is to provide the aforementioned compositions. It is a further object to provide these compounds by procedures which render them in high yield and purity. A still further object is the preparation of the metal salts of a 2-carboxy-3-metallo propene by thermal conversion of the compounds of this invention. These and other objects shall appear more fully hereinafter.

The above and other objects of this invention are accomplished by reacting the metal salt of a 2-methyl propenoic acid with a metallating agent. In this manner it is possible to produce a bimetallic salt of a 2-(aminodihydroxymethyl)-1-propene which constitutes the novel compositions of this invention.

It is particularly preferred to react the alkali or alkaline earth metal salts of 2-methyl propenoic acid and the exo hydrocarbon derivatives thereof with a metallating agent. By the term "exo" is meant a derivative of 2-methyl propenoic acid wherein one or more of the hydrogen atoms on the 3-carbon atom and the carbon atom of the 2-methyl substituent have been replaced by a hydrocarbon group. The term metal salts of a 2-methyl propenoic acid includes these exo derivatives.

Suitable metallating agents comprise metal amides. When employing these metallating agents the alkali or alkaline earth metals, or the amide derivatives thereof, are generally employed. Of these metal amides, sodium amide is most often utilized. Illustrative of the above processes and a preferential embodiment of this invention, is the reaction between the sodium salt of 2-methyl propenoic acid and sodium amide at temperatures below 180° C. to produce the disodium salt of 2-(aminodihydroxymethyl)-1-propene.

Preferred compounds of this invention are the bimetallic salts of 2-(aminodihydroxymethyl)-1-propene and the exo-hydrocarbon derivatives thereof wherein the metallic substituents are alkali or alkaline earth metals. Within this group sodium, potassium and lithium are most suitable.

By "exo-hydrocarbon derivatives" is meant the derivatives of 2-(aminodihydroxymethyl)-1-propene wherein one or more of the hydrogen atoms on either the 1 or 3 carbons in the propene chain, or the hydrogen atoms on the nitrogen of the amino group, have been replaced by a hydrocarbon group. The phrase "a bimetallic salt of a 2-(aminodihydroxymethyl)-1-propene," as used in the specification and claims of this invention, includes these exo-derivatives.

These bimetallic compounds are brightly colored products which are inert to carbon dioxide and which do not evolve a gas upon formation. However, upon heating to a determinate critical temperature the compounds change color, evolve ammonia gas and convert to products which react smoothly and rapidly with carbon dioxide at room temperature, do not melt below their decomposition temperature and which are slightly soluble in certain solvents, suhc as tetrahydrofuran and the methyl ether of ethylene glycol.

It can thus be seen that the compositions of this invention are temperature-sensitive products. Because of this characteristic, the process for preparing these compounds employs critical temperature ranges outside of which the desired product is not produced. In general, this range can be expressed as a temperature sufficient to initiate the reaction, but below the conversion temperature of the bimetallic salt of a 2-(aminodihydroxymethyl)-1-propene produced. (By conversion temperature is meant that temperature at which decomposition of the bimetallic propene salt to a carboxy propene salt occurs—as evidenced visually by color change and evolution of gas.) In most cases, the process is conducted within about 20° C. of the color change point and below the decomposition temperature of the bimetallic propene product. Within this latter range the reaction is conducted at a temperature between about 140° and 180° C.

Another embodiment of the instant invention is the preparation of a metal salt of a 2-carboxy-3-metallo propene by a process comprising heating the novel bimetallic salts of a 2-(aminodihydroxymethyl)-1-propene and the exo-hydrocarbon derivatives thereof at a temperature between about the decomposition temperature of said 2-(aminodihydroxymethyl)-1-propene and the decomposition temperature of said 2-carboxy-3-metallo propene. Exemplary of this process is the preparation of the sodium salt of 2-carboxy-3-sodio-propene from the disodium salt of 2-(aminodihydroxymethyl)-1-propene employing a temperature of between 180°–290° C.

In preparing the novel bimetallic salts stoichiometric quantities of reactants are employed; the reactants being substantially anhydrous and preferably of a small particle size. The starting material should be essentially free of organometallics, other than the products desired. In one embodiment a premix of the reactants is prepared; the premix is fed continuously to a heated surface blanketed by an inert atmosphere, the sodio product subsequently being recovered from the heated surface. The reaction is conducted at atmospheric pressure.

Reference to the following working example more fully illustrates the preparation of the novel compositions of matter of this invention. In this and other working examples which appear hereinafter, all parts and percentages are by weight unless otherwise specified.

*Example I*

One hundred eight parts of sodium methacrylate and 30 parts of sodium amide were blended together for 2 hours with grinding. The ground material was fed to a reaction vessel and heated to 160° C. for a period of 1 hour and 30 minutes. The reaction mixture was then cooled and a bright yellow product discharged. Attempts to carboxylate the yellow end-product to carbon dioxide were unsuccessful.

The bright yellow product produced was identified in the following manner:

Forty parts of the product produced were placed in a reaction vessel provided with means for heating, stirring, evolution of gas, and means for mass temperature measurement. The mixture was then heated. At 25° C. the product was bright yellow and at 184° C. the product changed to orange-tan with ammonia evolved. The mixture was kept at this temperature for 15 minutes. The heat was shut off and the product cooled. The cooled orange-tan product was then subjected to carboxylation with carbon dioxide. The temperature rose from 25° to 60° C. in 2 minutes. Carbon dioxide was fed for a period of 15 minutes with an increase in volume of product which turned a creamy-white in color. An overall weight increase of 10 percent over the bright yellow starting material was thereby produced. The final product of carboxylation was disodium itaconate produced by carboxylation of the sodium salt of 2-carboxy-3-sodio propene resulting from thermal conversion of the bright yellow product.

Thirty parts of the bright yellow product from Example I were hydrolyzed with 100 milliliters of water under nitrogen atmosphere. Little heat was evolved. A small portion of the water solution produced was diluted and run through a cation exchange column and thus acidified. The acidified solution was extracted with ether. The ether was evaporated leaving an oily product which was identified by infrared examination to be methacrylic acid. The non-acidified hydrolyzed product was evaporated under vacuum to dryness and then dried under vacuum over phosphorus pentoxide to complete the drying process. Infrared examination of this material showed it to be a material different in structure from the bright yellow starting material.

Infrared examination of the bright yellow material showed it to be a different chemical entity than either sodium methacrylate starting material or the sodium salt of 2-carboxy-3-propene.

The above facts demonstrate the bright yellow material formed in Example I to be a temperature-sensitive addition compound formed between sodium amide and sodium methacrylate. This compound can be represented by the following structure:

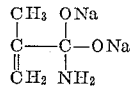

the disodium salt of 2-(aminodihydroxymethyl)-1-propene.

As is demonstrated in the foregoing example, it becomes necessary to stay within determinate critical temperature ranges when preparing the compositions of this invention in order to avoid decomposition or conversion. The following working example is more fully illustrative of the criticality of the conversion temperature.

*Example II*

Sodium methacrylate, 10.8 parts, and 3.9 parts of sodium amide were weighed and pre-ground together in a nitrogen atmosphere. The blended mixture was then placed in a reaction vessel provided with means for heating, measurement of mass temperature, nitrogen blanketing and nitrogen sweeping. Heat was applied to the system and the reaction mass observed as follows:

| Oil Bath Temp., ° C. | Reaction Mass,° C. | Observation |
|---|---|---|
| 153 | 149 | No change. |
| 170 | 165 | Turns yellow, no $NH_3$ evolved. |
| 174 | 170 | Bright yellow, no $NH_3$ evolved (Identified as the disodium salt of 2-(aminodihydroxymethyl)-1-propene). |
| 185 | 180 | Turning orange-tan, ammonia evolved. |
| 205 | 198 | Orange-tan, ammonia evolution rapid (Identified as the sodium salt of 2-carboxy-3-metallo propene). |

As is evident from the above discussion and examples, one of the reactants employed in the process of this invention is a metal salt of a 2-methyl propenoic acid.

The following non-limiting formula is exemplary of the types of acid salts employed herein.

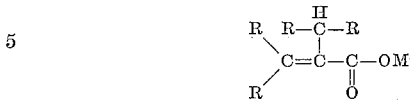

In this formula each R can be hydrogen or hydrocarbon groups which can be the same or different and can be monovalent or polyvalent. M is a monovalent or polyvalent metallic ion. Exemplary of the hydrocarbon groups which R represents are hydrocarbon groups containing about 1 through 20 carbon atoms. In general, lower hydrocarbon groups are employed, preferably those hydrocarbon groups containing between about 1 through 7 carbon atoms. Alkyl, alkenyl, aryl, cycloalkyl, alkaryl and cycloalkenyl hydrocarbon groups can be employed as the exo-hydrocarbon substituents in the acid salt reactant of this invention. It should be noted that the hydrocarbon substituents described hereinabove are free from substituents reactive with the metal or metal-containing reactants and products of this invention. Exemplary of groups which can be substituted on said hydrocarbons are ether substituents such as phenoxy phenyl, tertiary amino derivatives, nitroso derivatives, arsino and phosphino derivatives and the like.

The metals which constitute a portion of the acid salt which is employed as a reactant and which are represented in the foregoing exemplary formula as M can be the same or different and are monovalent or polyvalent metallic ions. The alkali and alkaline earth metals, especially sodium, are preferred. In general, any metallic ion can be employed which has a valence of 1 through 4 inclusive. As typical examples of these metals, sodium, potassium, rubidium, cesium, lithium and the like alkali metals; and calcium, barium, strontium, beryllium, magnesium, radium and the like alkaline earth metals are representative. Other metals can be, for example, aluminum, cadmium, cerium, chromium, copper, iron, lead, nickel, zinc and other metals having a valence of 1 through 4 inclusive which shall be shown more fully hereinafter. It is preferred that the alkali or alkaline earth metals be employed primarily because of their greater availability and reactivity. In this respect sodium has been found to be particularly suitable.

The other reactants employed in the processes of this invention are metallating agents. These metallating agents in the preferred case are metal amides. In addition to metal amides, there can be employed the lower alkyl derivatives of metal amides.

The metallic portion of these metallating agents are monovalent or polyvalent metals; it is particularly preferred to employ the alkali or alkaline earth metals, especially sodium, although other metals can be employed. In general, any metal can be utilized which has a valence of 1 through 4 inclusive, such as those metals which were described hereinbefore in discussing the acid salt reactant of this invention.

The metal amides or lower alkyl derivatives thereof can be prepared by any method known to the art. For example, metal amide derivatives are readily prepared by reacting amines with the metal in the presence of a conjugated polyene. Sodium propyl amide is prepared by reacting n-propyl amine with finely divided sodium in the presence of butadiene. It is preferred to employ lower alkyl groups which form amine derivatives boiling at about 100° C. or less and being relatively stable under the reaction conditions of this invention. Examples of the amides employed in the instant invention are the methyl, ethyl, isopropyl, propyl, butyl and the like derivatives of metal amides. These amides can be sodium, potassium, or lithium amides, magnesium amide, calcium amide and the like. In short, the corresponding amides or lower alkyl amide derivatives of monovalent or polyvalent metals, said metals having a valence of 1 through 4 inclusive, can be employed.

Other metallating agents of this invention can be metal hydrides. Illustrative of metallic hydrides which can be employed are potassium hydride, aluminum hydride, magnesium hydride, cesium hydride, beryllium hydride, rubidium hydride, copper hydride, calcium hydride, titanium hydride, zirconium hydride and the like.

Having described the reactants employed herein and having illustrated through working examples the best modes which can be employed in preparing the compositions of the instant invention, the following discussion will deal more fully with the compositions produced thereby.

Reference to the following illustrative formula will more fully clarify the type of compositions encompassed by this invention.

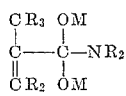

In the above formula each R can be hydrogen, or hydrocarbon groups which can be the same or different; each M is a metal which can be the same or different, comprising mono- or polyvalent metallic ions having a valence of 1 through 4 inclusive. In other words, the R groups and the metals in the instant formula have the same definition as set forth hereinabove in defining the acid salt reactants of the instant invention.

Following is a list of specific compounds which are representative of the compositions produced in this invention. The compounds are named as the exo-hydrocarbon derivatives of 2-(aminodihydroxymethyl)-1-propene. For example, the disodium salt of 2-(aminodihydroxymethyl)-1-butene, where named as an exo-hydrocarbon derivative of 2-(aminodihydroxymethyl)-1-propene is called the disodium salt of 2-(aminodihydroxymethyl)-3-methyl-1-propene. Thus, in Example I, when potassium amide is reacted with the sodium salt of 2-methyl propenoic acid employing essentially stoichiometric proportions, the sodium potassium salt of 2-(aminodihydroxymethyl)-1-propene is produced. Similarly, in such a fashion, other alkali and alkaline earth dimetallo derivatives of this compound can be prepared such as the lithium, rubidium, cesium, francium, beryllium, magnesium, calcium, strontium, barium and radium salts of a metallo sodium 2-(aminodihydroxymethyl)-1-propene. Employing the process of Example I, it is possible to prepare a wide variety of other metallic derivatives, as for example, when the appropriate metal amide is reacted with the sodium salt of 2-propyl propenoic acid. Thus when aluminum amide, gallium amide, tellurium amide, zinc amide, cadmium amide, copper amide, nickel amide, cobalt amide, iron amide, chromium amide, vanadium amide, titanium amide, lanthanum amide are reacted with the above metal salt the corresponding metallo sodium derivatives of 2-(aminodihydroxymethyl)-3-ethyl-1-propene are produced. Likewise, employing the process of Example I, the calcium sodium salt of 2-(aminodihydroxymethyl)-3,3-dimethyl-1-propene is prepared when sodium amide is reacted with the calcium salt of 2-tertiary-butyl-propenoic acid. Similarly, employing procedures analogous to those taught hereinabove, it is possible to prepare any of the compounds of this invention.

It is to be noted that in addition to those metals described in the above representative list other metallic ions having a valence of 1 through 4 inclusive can be employed. Thus in any of the above compositions, there can be substituted for the specific metals the following: polonium, antimony, bismuth, germanium, tin, lead, aluminum, gallium, indium, zinc, cadmium, mercury, platinum, nickel, osmium, technetium, tungsten, tantalum, molybdenum, chromium, iron, cobalt, rhodium, manganese, vanadium, niobium, titanium, zirconium, scandium, lanthanum and the like.

In addition to the metallating agents described hereinbefore, which are preferred in the process of this invention because of short reaction rates, ease of handling and good yields, it is possible to utilize other metallating agents such as those metallating agents which can be represented by the formula $R_xM$ wherein R is an organic moiety and M is a metal having a valence of 1 through 4 inclusive, such as those metals described hereinbefore. Thus, specific examples of this type of metallating agent are amyl sodium, disodio octadiene, zinc alkyls such as dimethyl zinc, diethyl zinc, and the like. Furthermore, in some instances it is possible to employ as metallating agents in this invention metallic imides such as sodium imide, lithium imide and other metallic imides wherein the metallic substituent has a valence of 1 through 4 such as those metals defined hereinbefore.

In certain instances melting point depressants can be employed, thus permitting conducting the reaction with metal amides at even lower temperatures. For example, when sodium amide is reacted with the sodium salt of 2-methyl propenoic acid an appropriate amount of sodium hydroxide can be mixed with the sodium amide. This decreases the melting point of the latter and thus permits conducting the reaction at a lower temperature. In the case where a melting point depressant is employed temperatures considerably below 160° C. are possible. For example, temperatures between about 100° to 160° C. could be employed. Other melting point depressants which can be used are the halides of the metals. Others will become evident to those skilled in the art.

An excess of either reactant can be employed, however, if an excess of one of the reactants is employed, it is preferable that the metallic salt of the organic acid be in excess so that the metal amide or hydride will be essentially quantitatively consumed. In this manner the product obtained may contain some metal salt of 2-methyl propenoic acid or metallic hydrides thereof, but this impurity has not been found detrimental in subsequent use of the bimetallic salt of the 2-(aminodihydroxymethyl)-1-propene product. In an especially preferred embodiment, essentially stoichiometric quantities of the reactants are employed.

The particle size of the reactants is important. In general, it is preferred to employ particle sizes below about 50 microns. The smaller the particle size, the more intimate contact obtained between the reactants resulting in lower reaction temperatures and shorter reaction periods. As noted previously, the reactants are premixed and fed continuously to a heated surface. Although not required, this is the preferred mode of operation since more efficient comminution of the reactants is obtained. It should be understood that the reactants need not be pre-ground or premixed, but can be fed to the reactor separately in larger particle sizes and mixed and ground in situ. This is particularly true when the agitation provided in the reactor is of the type to provide grinding of the reaction mixture during the course of the reaction. Employing the technique of the grinding along with the agitation enhances the contact between the reactants, thus providing more complete reaction. One suitable method of obtaining this objective is to employ a ball mill as a reactor. Other apparatus can be employed which will be evident to those skilled in the art.

The reaction should be conducted in an inert atmosphere such as argon, nitrogen, krypton and the like. It is preferable that the inert atmosphere be pre-purified so as to be substantially free of impurities such as oxygen and moisture, since these impurities may be taken up in the product. One of the purposes of such an embodiment is to avoid oxygen contamination by impurities in the flushing gas. The inert liquid blanket employed is generally a high boiling hydrocarbon oil, such as mineral oil.

The process of this invention is suited to continuous methods. For example, the reactants, separately or together in the proper proportions, are continuously ground to the desired particle size and transmitted to a heated movable reactor surface, and the product is continuously discharged from the reactor. This and other modifications will be evident to those skilled in the art.

Although it is generally preferred to employ the metal salt of an organic acid, as described hereinabove, it is obvious that the free acid can also be employed to produce the metal salt in situ. Such an embodiment although utilizing two equivalents of metal for each equivalent of metallated product produced, nevertheless only employs one equivalent of metal in the metallation of the 3-carbon position. This embodiment thus is consistent with the stoichiometry described hereinbefore.

When reacting metallic salts of an organic acid with metallating agents according to this invention, the bimetallic propene salts as described hereinbefore are obtained essentially free of other organometallic compounds. That is, the products as obtained by our process are not contaminated with more than about 0.5 percent by weight of other organometallic compounds. The process of this invention thus provides these products in essentially pure form thereby permitting their utility in a variety of chemical reactions without the hindrance of competing reactions and the formation of impurities in the final products.

The following working examples more fully illustrate the above described embodiments of this invention.

*Example III*

Into an autoclave provided with means for stirring and preheated to a temperature of 140° C. is charged a mixture of 108 parts of the sodium salt of 2-methyl propenoic acid, 39 parts sodium amide. Stirring is continued for five minutes whereupon the mass is cooled to room temperature and discharged from the autoclave. The product produced thereby is the disodium salt of 2-(aminodihydroxymethyl)-1-propene.

*Example IV*

Into a reaction vessel is added 200 parts mineral oil. The mineral oil is heated to a temperature of 165° C. whereupon 100 parts of the sodium salt of 2-ethyl propenoic acid and 134 parts of dimethyl sodium amide is added while the reaction mixture is agitated by means of high speed stirring. The stirring and heat are maintained for a period of three hours. The reaction is cooled and the solids filtered off. The product obtained thereby is the disodium salt of 2-(aminodihydroxymethyl)-1-propene.

*Example V*

The process of Example IV is repeated with the exception that 180 parts of the lithium salt of 2-benzyl propenoic acid is employed in place of 100 parts of the sodium salt of 2-ethyl propenoic acid and 250 parts of dimethyl ether of diethylene glycol are used in place of mineral oil. Thereby is obtained the lithium sodium salt of 2-(dimethylaminodihydroxymethyl) - 3 - phenyl - 1 - propene in good yields.

The compositions produced in the instant invention find utility in the preparation of metal salts of a 2-carboxy-3-metallo propene and the exo-hydrocarbon derivatives thereof as has been more fully described hereinbefore. In addition to this utility, the bimetallo salts of 2-(aminodihydroxymethyl) propene compositions of this invention provide a simple and economical route for the preparation of methacrylamide and its exo-hydrocarbon derivatives.

The following working example further illustrates this additional utility.

*Example VI*

Into a reaction vessel containing water saturated with ammonia is placed 30 parts of the disodium salt of 2-(aminodihydroxymethyl)-1-propene. After sufficient time for hydrolysis to take place has elapsed the methacrylamide product is extracted from the aqueous mixture with benzene. Thereafter the benzene is distilled and methacrylamide is obtained. This material is useful in the preparation of polymers.

Having thus described the products of this invention and the best modes for the preparation thereof, it is not intended that this invention be limited in any manner except as set forth in the following claims.

We claim:

1. As compositions of matter, the bimetallic salts of a 2-(aminodihydroxymethyl)-1-propene having the formula

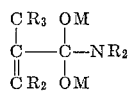

wherein each radical designated by R is individually selected from the group consisting of hydrogen and hydrocarbon radicals, said hydrocarbon radicals containing from 1 to about 7 carbon atoms and being selected from the group consisting of alkyl, alkenyl, aryl, cycloalkyl, alkaryl and cycloalkenyl hydrocarbon groups; and wherein each group designated by M is individually selected from the group consisting of alkali and alkaline earth metals.

2. The composition of claim 1 wherein each group designated by R is hydrogen.

3. The composition of claim 1 wherein the groups designated by M are lithium.

4. The composition of claim 1 wherein the groups designated by M are sodium.

5. The composition of claim 1 wherein the groups designated by M are potassium.

6. The disodium salt of 2-(aminodihydroxymethyl)-1-propene.

References Cited in the file of this patent

UNITED STATES PATENTS

| | | |
|---|---|---|
| 2,438,164 | Harrington et al. | Mar. 23, 1948 |
| 2,784,233 | Kottler et al. | Mar. 5, 1957 |
| 2,824,130 | Robertson et al. | Feb. 18, 1958 |
| 2,901,513 | Thomas | Aug. 25, 1959 |